Feb. 11, 1930. A. J. VANCE Re. 17,594
DRIER FOR VENEER, WALL BOARD, AND THE LIKE
Original Filed Aug. 1, 1924 5 Sheets-Sheet 1
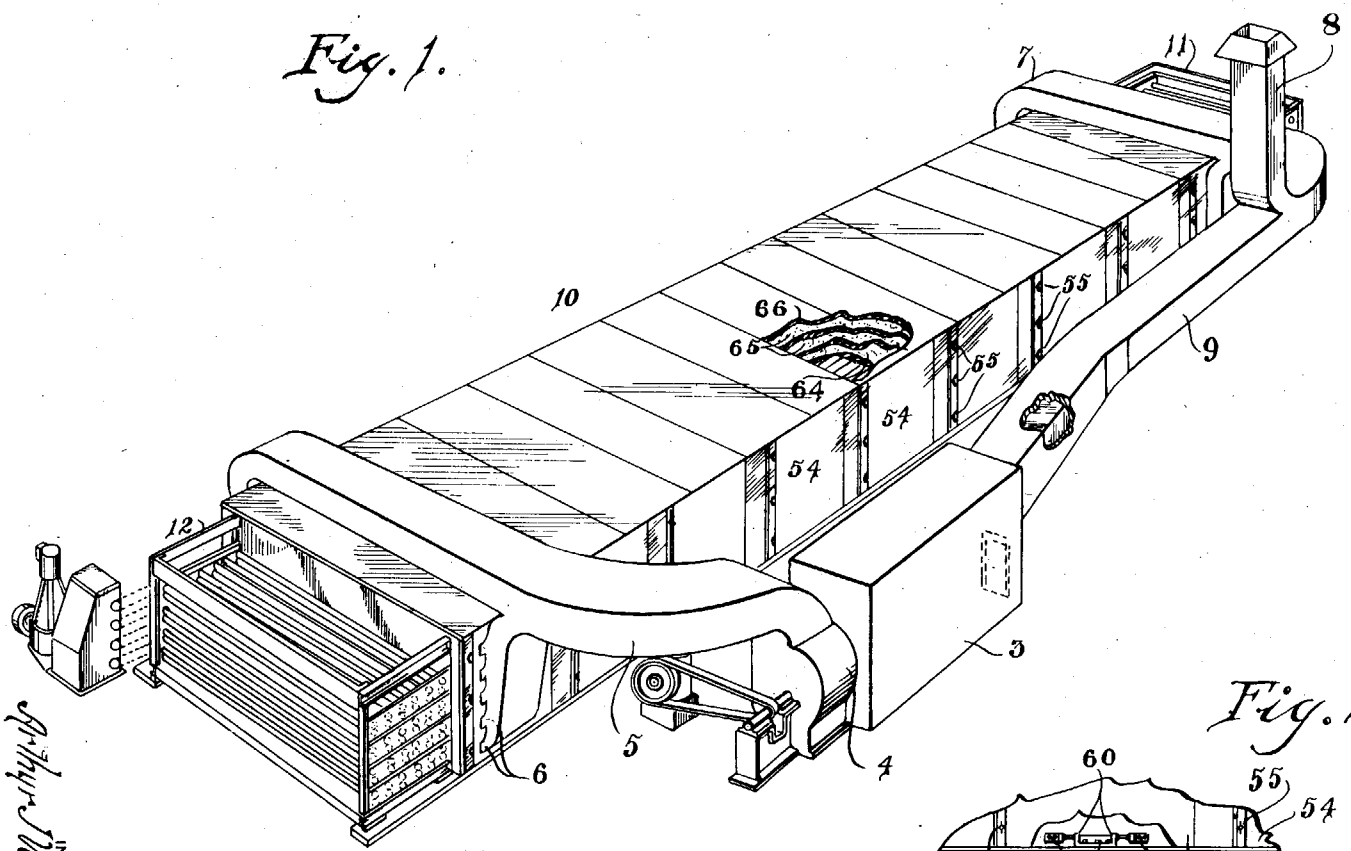
INVENTOR
Arthur J. Vance
BY
Kerr, Hudson & Kent
ATTORNEYS Feb. 11, 1930. A. J. VANCE Re. 17,594
DRIER FOR VENEER, WALL BOARD, AND THE LIKE
Original Filed Aug. 1, 1924 5 Sheets-Sheet 2
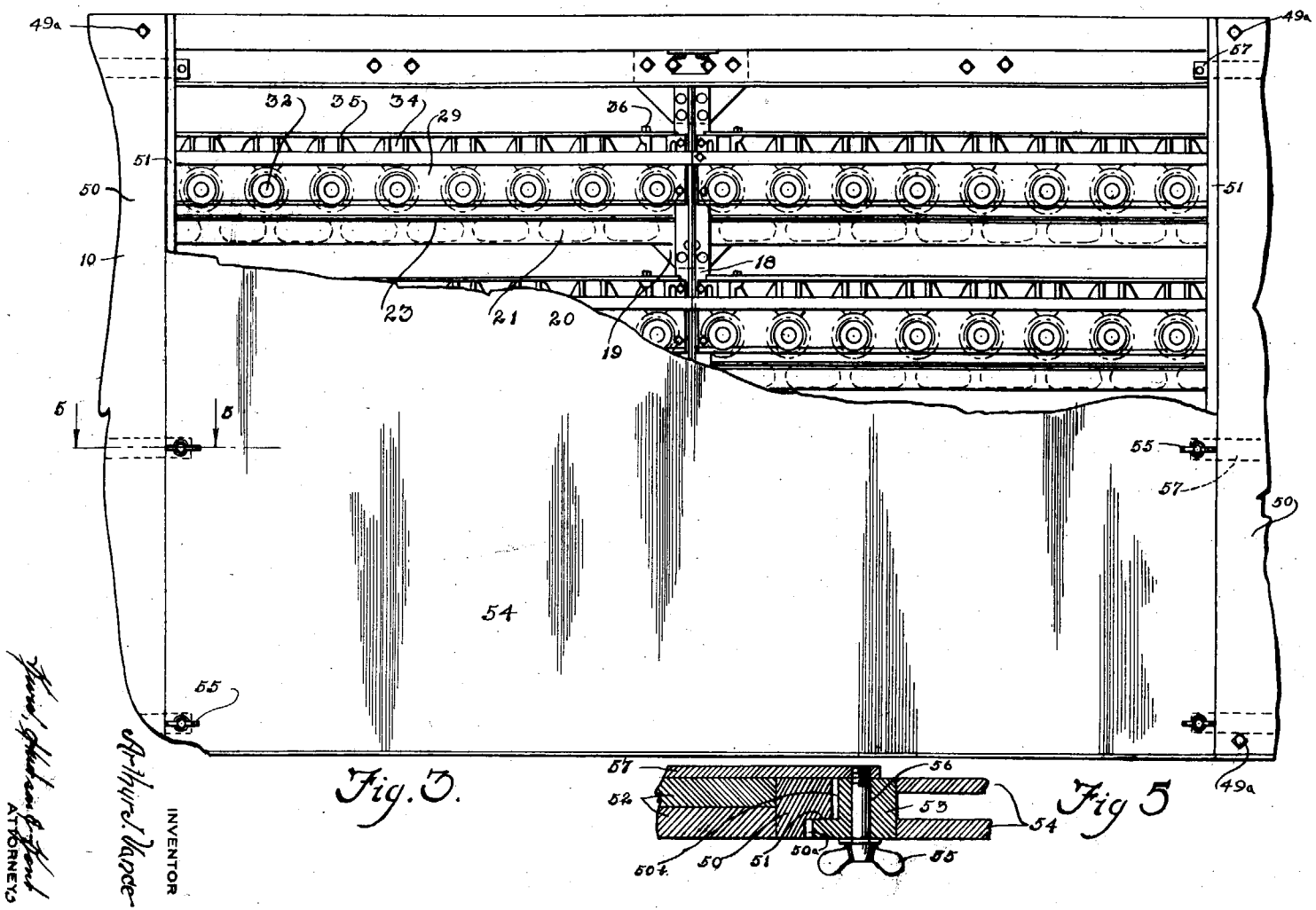

Feb. 11, 1930. A. J. VANCE Re. 17,594

DRIER FOR VENEER, WALL BOARD, AND THE LIKE

Original Filed Aug. 1, 1924 5 Sheets-Sheet 3

INVENTOR
Arthur J. Vance

Davis, Hudson & Hunt
ATTORNEYS

Feb. 11, 1930. A. J. VANCE Re. 17,594

DRIER FOR VENEER, WALL BOARD, AND THE LIKE

Original Filed Aug. 1, 1924 5 Sheets-Sheet 4

INVENTOR

Arthur J. Vance

BY

Davis, Hudson & Kent

ATTORNEYS

DRIER FOR VENEER, WALL BOARD, AND THE LIKE

Original Filed Aug. 1, 1924 5 Sheets-Sheet 5

INVENTOR

Arthur J. Vance

BY

Kerr, Hudson & Kent

ATTORNEYS

Reissued Feb. 11, 1930

Re. 17,594

UNITED STATES PATENT OFFICE

ARTHUR J. VANCE, OF PAINESVILLE, OHIO, ASSIGNOR TO THE COE MANUFACTURING COMPANY, OF PAINESVILLE, OHIO, A CORPORATION OF OHIO

DRIER FOR VENEER, WALL BOARD, AND THE LIKE

Original No. 1,656,802, dated January 17, 1928, Serial No. 729,618, filed August 1, 1924. Application for reissue filed July 7, 1928. Serial No. 291,093.

This invention relates to driers such as are used for drying and seasoning veneers, wall board and other like material.

More particularly the invention relates to a drier for the above purpose wherein the material passes slowly through a long horizontally arranged drying chamber, conveying means being provided within the chamber for moving the strips or sheets of the material under treatment from one end of the chamber to the other. The air circulating system is described in my Patent No. 1,675,284 issued June 26, 1928.

Driers of this description are subject to considerable changes in temperature and are frequently of considerable length, the length in some cases running into several hundred feet. Since the structure supporting the conveying means is preferably continuous for construction purposes, the changes in temperature in such driers are accompanied by correspondingly great expansion and contraction of the frame and when the drier is of considerable length the structure frame can be built in expansion sections with suitable spaces between them, each expansion section being anchored in its middle. The description herein refers to driers of a single expansion unit. The usual construction of the frame work of these driers has included bottom sills on each side of I-beam or channel section resting on rollers which in turn rested on a metal track on the foundation. Prior construction has also included the anchoring of the bottom sills to the foundation at one end of the drier, so that the expansion and contraction took place from the anchored end of the drier. The longitudinal top sills of the frame work have been made of channels, supported by vertical members which rest on the top of the longitudinal bottom sills. It is necessary to insulate driers of this type by housings and the sides are made of removable panels, for convenient access to the bearings, chains and interior of the drier. Prior construction used metal brackets secured to the outer sides of the longitudinal bottom and top sills in such manner that the side panels, when supported by said brackets did not insulate, or cover the sides of the longitudinal bottom and top sills, but left them exposed to radiate heat from the drier to the outside. Furthermore, the fact that no housing was provided outside the bottom sills resulted in leaving open spaces between the expansion rollers, on which the bottom sills rested, and between the bottom of the bottom sills and the top of the foundation; the said open spaces allowing large air leakage between the inside and outside of the drier and making it more difficult to accurately control the air movements inside the drier. Moreover these housings usually have ends provided with horizontal slots through which the material is introduced and, after the treatment, passed out. These slots are also further cause of heat loss in the usual construction.

In addition to the heat losses the anchoring of a long drier at one end presents many mechanical difficulties due to the expansion and contraction. For instance, the force developed against the anchoring device is on one side so that the stresses produced are high.

With the above facts in mind, the important objects of the present invention are to so improve the construction of the driers of this description that but little escape of heated air, steam, or other drying medium will be permitted from the interior of the housing into the atmosphere, the entry of cold exterior air will be prevented, the difficulties of anchoring the device will be reduced to a minimum, and provision will be made for so adjusting the relative positions of the sides of the drier longitudinally that a proper feed of the strips or sheets being treated will be ensured.

With the above and other objects in view one specific form of the invention will now be particularly described, and hereinafter specifically pointed out in the claims, reference being had to the accompanying drawings, wherein:

Figure 1 is a perspective view, of a drier constructed in accordance with this invention.

Figure 2 is a fragmentary detail at one side of the drier with the housing broken away to show the anchor at that point.

Figure 3 is a side elevation on an enlarged scale, showing a portion of such a drier, part of the housing being broken away to disclose the interior construction.

Figure 4ª is a fragmentary detail of the drive chain and roll sprockets.

Figure 5 is a detail horizontal section through a door fastening means.

Figure 4:
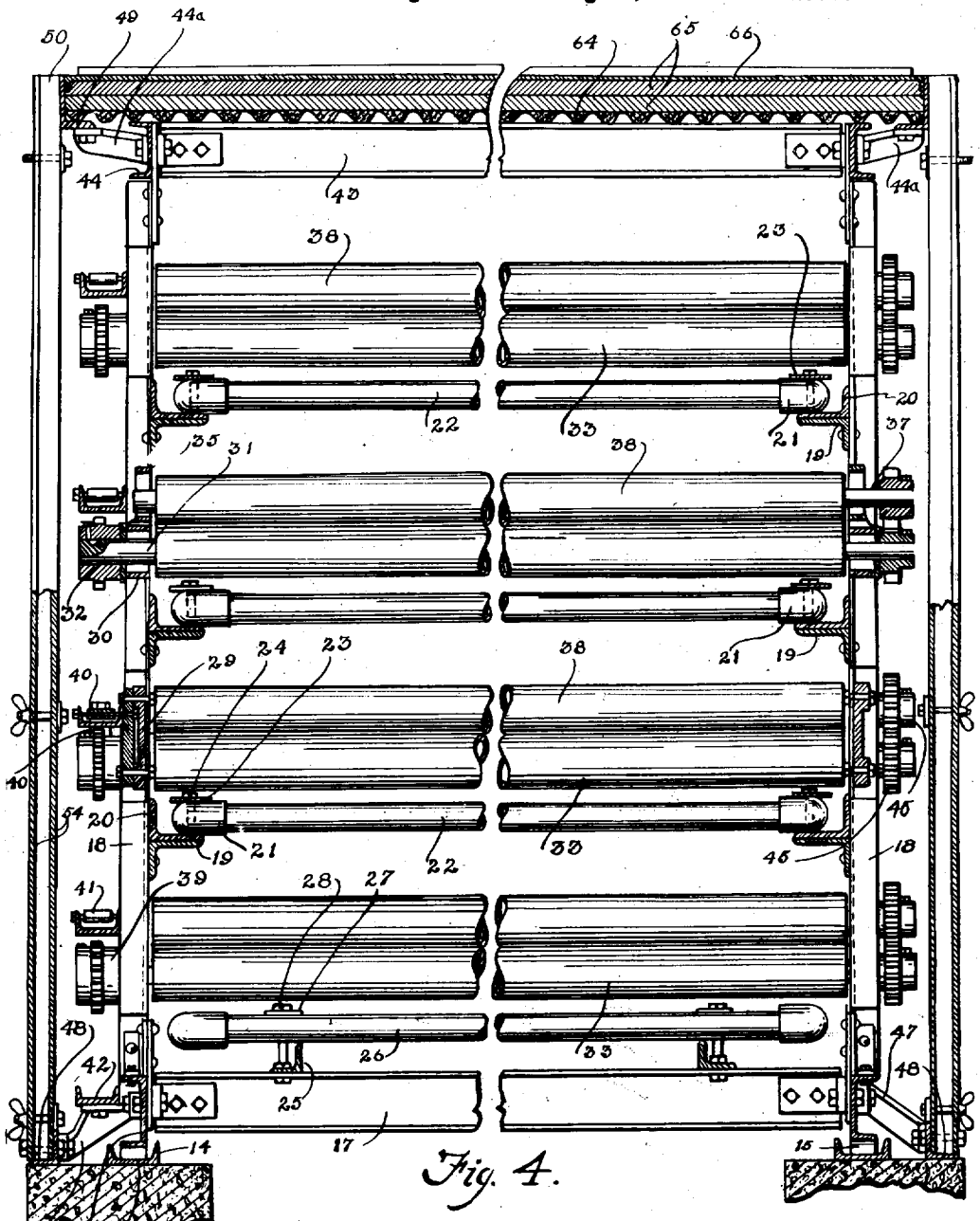
Figure 4 is a cross section through such a drier as is shown in Figure 3.
Figure 4A:
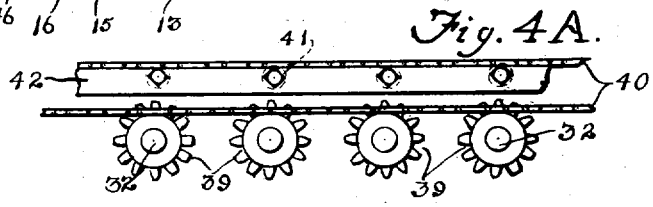
Figure 7:
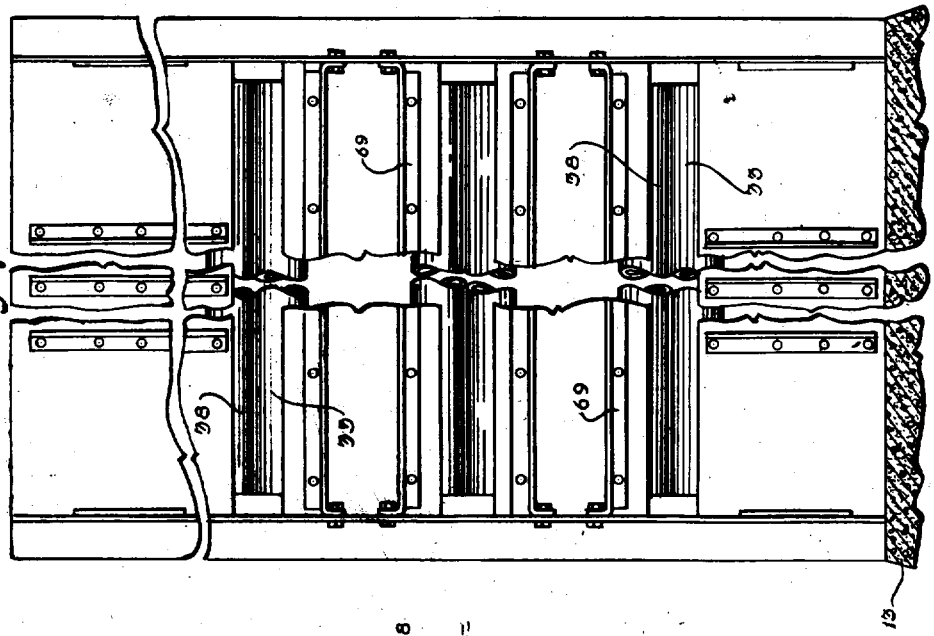
Figure 7 is a partial elevation of one end of the drier showing the manner of supporting the housing at the end.

The drier proper comprises an elongated housing indicated in general at 10 and having at one end feeding roll section 11 and at the other end a receiving and cooling section. The heated air which constitutes the drying medium, is drawn from the air heater 3, and passes through the casing 4 of the fan blower and from the air supply duct 5 into the air jet nozzles 6 upon either side of the drier, which distributes the hot air between the pairs of conveyor rolls in the manner described in my Patent No. 1,675,284, issued June 26, 1928. The air is withdrawn at the feeding end into the return air ducts 7, and is either shunted in whole or in part through the stack 8 or returned through the duct 9 to be reheated in the heater 3. In the construction of the drier there is provided on each side an elongated foundation 13 whereon is laid a channel iron track 14 in which are located rollers 15. These rollers support the longitudinal lower side sills 16 of the frame for supporting the conveyor rolls and heating elements. The side sills 16 are connected by transverse sills 17 and extending up from each side sill are the vertical frame members 18, each being here shown as formed of a pair of structural steel angles arranged back to back. On each of the frame members 18 are a series of brackets 19 and carried by these brackets are lengths of structural angles 20 which serve to support the return bends 21 of heater coils 22, these bends being held in position by cover plates 23 and bolts 24. Secured to the sills 17 are angles 25 which connect the sills with each other and which support the lower heater coils 26, the coils being held in position by cover plates 27 secured by bolts 28. Carried by the upright members 18 are roll journal bearing bars 29 having lower openings 30 wherein are supported, by means of roller bearings 31, the journals 32 of lower conveyor rolls 33. Also the bars 29 are provided with slotted bearings 34, opening at the top but normally closed by cover plates 35 secured in position by the bolts 36. These slots receive the journals 37 of the upper conveyor rolls 38 which are thus permitted to rise and fall within definite limits. At one side of the frame thus formed, the lower journals 32 are provided with sprocket wheels 39 on which runs a sprocket chain 40, the return portion of this chain being supported on idler rolls 41 carried in the channel 42 which is secured to and connects the frame members 18. At the other side of this frame the upper and lower journals carry the star wheels 45 which connect the upper and lower rolls so that they rotate in unison. At the top the members 18 are connected by transverse top sills 43 which have at their ends longitudinally extending channels 44. By the construction which is described it will be seen that there is provided within the housing a continuous conveyor and heater coil supporting frame which is free to move, as by expansion or contraction under different heat conditions, on the rolls 15.

At intervals along the lower longitudinal sills 16, there are provided outwardly and downwardly extending brackets at one side, which are preferably formed as shown at 46, to support the lower channel 42, while on the other side they are formed as at 47. The outer and lower ends of these brackets carry outwardly extending angle bars 48 which form the bottom sills of the housing frame. These angle bars are so positioned as to slide on the top of the foundation 13, being thus free to move, under the expansion and contraction before mentioned, without dragging on the foundation while at the same time they practically prevent air from passing either in or out of the housing beneath its side walls. Similarly at the top of the device the channels 44 support brackets 44ª which support members 49 of the housing frame. Suitably secured to these angles 48 and 49, as by bolts 49ª, are narrow door panels 50, which are rabbeted to receive door panels 54, which are secured thereto by studs 56, inserted in bars 57, and held on by washers and thumb nuts 55. It will be noted in Figure 5 that the rabbeting of the wide doors and narrow doors is such as to leave the small spaces 50ᵇ and 50ª to provide for unequal expansion of the housing doors as compared to the frame. Similar rabbeting of the housing doors is used when the frame work of long driers is built in expansion sections with spaces between the ends of the sections, so that the housing is continuous with joints to take up the expansion and contraction. It will be seen that the side housing doors 50 and 54 completely enclose all parts of the frame work of the drier and that they extend from the foundation to the top insulation, preventing the leakage under the bottom sills between the expansion rollers. I further greatly reduce the heat losses by eliminating the longitudinal air duts at each side of the drier between the frame and the housing by eliminating the air flues heretofore employed, such as shown for instance, at M, M′ in Fig. 3 of patent to Coe No. 1,000,376, dated August 13, 1911, and introducing the hot air from the hot air conduits 5 directly between the pairs of rolls by means of nozzles 6 which extend through the side walls of the housing at points located between pairs of rolls as indicated in Fig. 1. I am thereby enabled to bring the side walls of the housing close to the side frames, merely leaving sufficient clearance for the end bearings of the rolls, as shown in Fig. 4.

In order to anchor the structural or main frames so as to keep them from creeping along the foundation it is necessary to tie them down to the foundation at some point. Experience has shown that tying these frames at one end to the foundation is not satisfactory and in order to properly secure the frames it is preferred that a bracket 58 be secured centrally of the drier to the foundation as by the bolts 59, the bracket having spaced arms 60 which extend between the flanges of the channel 16. One of these devices is provided on each side and each channel has secured to its web a pair of spaced brackets 61 which are connected to the brackets 60 adjusting screws 62, and nuts 63. By this means the central portion of the frame is held fixed and each end allowed to expand freely. Furthermore, it is found that if misalignment of the frame causes one side to be more advanced than the other so that the rolls are not at right angles to the direction of travel of the material being fed through the drier, that the latter tends to move to one side of the frame and its passage is interfered with. This may be corrected by slightly adjusting the relative positions of the sides of the frame and this adjustment is effected by proper manipulation of the adjusting screw 62 just referred to.

The angles 49 front each other and supported on these angles and the transverse members 43 is a corrugated sheet 64 on which are layers of insulating material 65, a metal sheet 66 covering said layers. This forms the roof of the drier.

Figure 6:
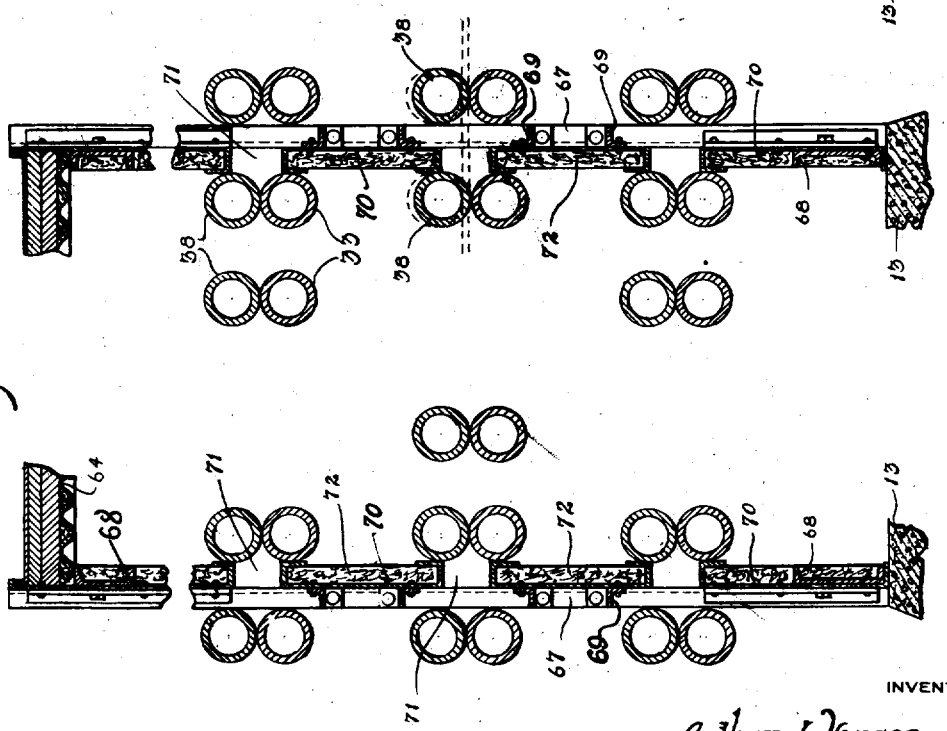
Figure 6 is a longitudinal section showing the arrangement at the ends of the drier for closing the entry and exit slots.
Figure 8:
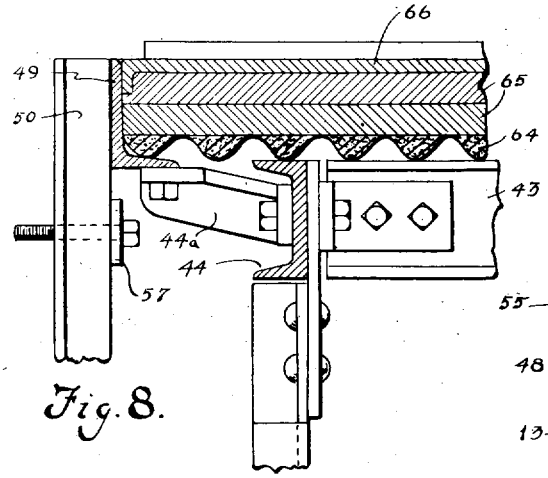
Figure 8 is an enlarged detail view of the upper longitudinal edge of the drier, the view being a section through this edge.
Figure 9:
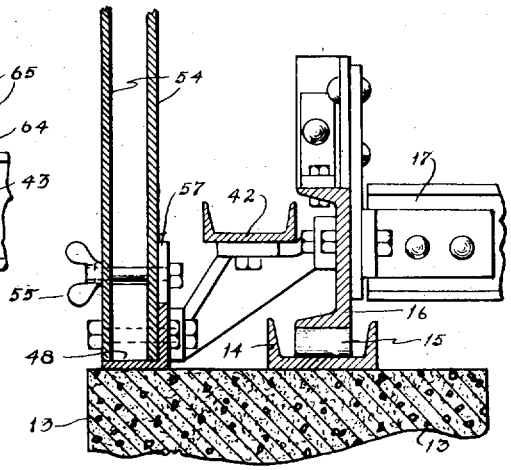
Figure 9 is a view similar to Figure 8 but showing the lower longitudinal edge arrangement.
Figure 10:
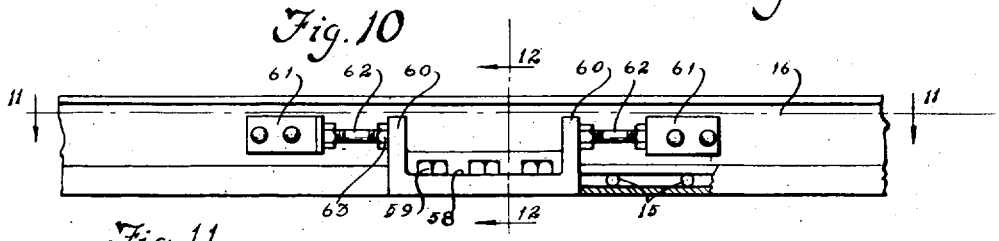
Figure 10 is an enlarged side elevation of the anchoring device.
Figure 11:
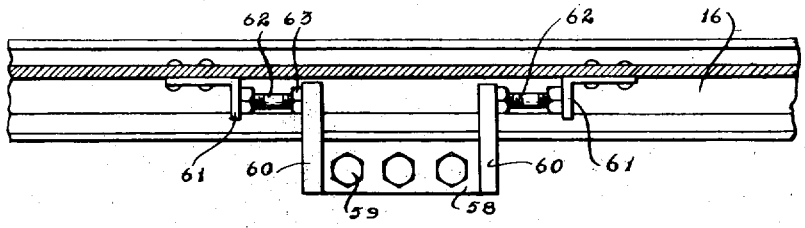
Figure 11 is a section on the line 11—11 of Figure 10.
Figure 12:
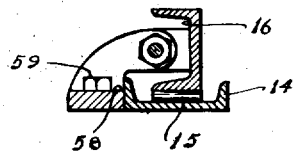
Figure 12 is a section on the line 12—12 of Figure 10.

At each end of the drier an end wall is provided, the outer or housing frame having corner posts 67 connected at the top and bottom by channel bars 68, and between the top and bottom by angle bars 69. These channel bars and angle bars support metallic casings 70 open on the inside and filled with heat insulating material, preferably asbestos slabs 72. The metallic casings are turned up and down inside at the top and bottom and are vertically spaced to provide inlet and exit openings 71 which are closed against the admission or outlet of air by arranging the end rolls 33 and 38 in close proximity to the inside surfaces of the metallic casings as shown in Figure 6 where it will be seen that these openings do not permit the passage of air. It is to be noted in Figure 6 that the supports for the rolls are omitted better to disclose the particular arrangement for closing these openings.

To render the drier more efficient it is important to prevent the passage of air into the drier or out of the drier through the entry and exit openings 71 during the passage of the material to be dried therethrough and when the conveyor rolls are not conveying the material therethrough. It should be remembered that the lower conveyor rolls 33 are mounted to rotate about fixed axes while the upper conveyor rolls 38 are adapted to rotate about a variable vertical axes to thereby accommodate the conveyor rolls for the reception of materials of various thicknesses. To fulfill this purpose the preferred arrangement is disclosed in which the lower conveyor rolls 38, adjacent the entry and exit opening 71, adapted to rotate about the fixed axes, are positioned in such manner that the peripheral surfaces of the rolls are at all times substantially in engagement with the inner surfaces of the turned-down portions of the metallic casings 70. It will be therefore noted that air will not be able to pass between the lower conveyor rolls 33 and the portions of the metallic casings with which they engage or at least any amount which would impair the efficient operation of the drier.

The upper conveyor rolls 38 which are adapted to rotate about variable vertical axes also have their peripheral surfaces in engagement with the turned-up portions of the lower ends of the metallic casings 70 when the upper conveyor rolls 38 are in engagement with the lower conveyor rolls 33, the rolls assuming this relative position when there is no material being conveyed through the rolls, so that the upper and lower conveyor rolls being in engagement prevents the passage of air through the openings 71 and also prevents the passage of air between the upper conveyor rolls 38 and the portions of the metallic casings 70 with which they engage.

When the material being treated passes between the lower and upper conveyor rolls the upper conveyor rolls are adapted to move vertically so as to receive the material being treated therebetween. The material being in engagement with both the upper and lower conveyor rolls and extending substantially from one side of the opening 71 to the other side of the opening prevents the passage of any appreciable amount of air between the rolls and as the upper conveyor rolls 38 move in vertical planes the peripheral surfaces of the upper conveyor rolls 38 cooperate with the turned-up portions of the lower ends of the metallic casings 70 as clearly indicated by dotted lines in Fig. 6, so that irrespective of the vertical movements of the upper conveyor rolls 38 within their limits, these conveyor rolls at all times substantially engage these portions of the metallic casings 70 thereby preventing the passage of air between the engaging surfaces irrespective of the positions of the upper conveyor rolls 38.

It will therefore be noted that a novel construction and arrangement has been provided whereby the passage of air through the openings 71 is substantially eliminated both at the time when the material being dried is being conveyed through the openings by the conveyor rolls and also at the time when the conveyor rolls are not functioning as conveyors of the material being treated. This materially adds to the efficiency of the drier in thus being able to maintain the predetermined desired temperature within the drier.

From the foregoing it will be obvious that provision is made for conserving the heat in the drier proper and for preventing the latter from cooling off either by flow of air around the bottom or end ports or by conduction through the walls and roof. It is also important to prevent radiation throughout the air circulating systems. I therefore encase the walls of the air ducts, and casings of the heater and fan blower with a thick heat insulating medium as indicated in Figure 1. By these various means I have effectually prevented the heat losses universally found in all prior veneer driers and have very materially increased the efficiency. Moreover I am now able to control the heat distribution throughout the drier in a manner heretofore impossible. Again, my method of anchoring the frame causes the expansion of one part of the drier to be balanced by the expansion of the other so that little or no stresses are brought on the holding-down bolts, and also provides means for aligning the opposite ends of the rolls.

It will be obvious that changes may be made in this specific structure here shown, such changes being within the scope of engineers and not requiring invention. It is not, therefore, desired to confine the invention to the exact form herein shown and described but it is wished to include all that properly comes within the scope claimed.

Having thus described the invention, what is claimed as new is:

1. In a drier of the class described, a foundation, a drier frame including longitudinally extending sills, longitudinal track ways resting on the foundation beneath the sills, rollers in said track ways supporting said sills, a pair of spaced arms projecting from the central portion of each sill, brackets each secured to the foundation and each projecting between a cooperative pair of arms, and adjusting screws connecting said brackets and arms.

2. In a drier of the class described, a foundation, a drier frame including longitudinally extending sills, longitudinal track ways resting on the foundation beneath the sills, rollers in said track ways supporting said sills, securing means fixed to the foundation and connected to the longitudinal centers of the sills to hold the same immovable, brackets extending laterally from said frame sills, housing side sills carried by said brackets and extending along the foundation in close approximation thereto, an insulating housing having sides supported on the last mentioned sills, and other means for connecting the upper part of the frame and housing, whereby the frame is completely enclosed by the insulating housing.

3. In a drier of the class described, a conveyor roll supporting frame, means to anchor said frame at one point of its length whereby varying heat conditions may expand and contract the frame from and towards said point, a housing supported by and expanding and contracting with said frame, said housing being constructed to permit of a different rate of expansion from the frame, and having end walls provided with entry and exit slots extending horizontally of the ends, and conveyor rolls supported on said frame in spaced pairs, one roll of each pair being vertically aligned over the other, the end pair of said rolls being positioned within the housing opposite said slots and extending thereacross to close the same.

4. In a drier of the class described, a foundation, a roll supporting frame mounted thereon to permit expansion and contraction, a heat insulating housing entirely surrounding the sides, ends and top of said frame and extending down to the foundation and supported by said frame, said housing having entry and exit slots arranged horizontally in its ends, and conveyor rolls supported on said frame with the end rolls closing said slots.

5. In a drier as set forth in claim 4, means permitting said housing to expand and contract at a different rate from the frame.

6. In a drier of the class described, a foundation, a drier frame including longitudinally extending sills, longitudinal track ways resting on the foundation beneath the sills, rollers in said track ways supporting said sills, housing side sills carried by said frame and extending along the foundation in close approximation thereto, an insulating housing having sides supported upon said last mentioned sills, and means for connecting the upper part of the frame and housing whereby the frame is completely enclosed by the insulating housing.

7. In a drier of the class described, a foundation, a drier frame including longitudinally extending sills, longitudinal track ways resting on the foundation beneath the sills, rollers in said track ways supporting said sills, housing side sills carried by said frame and extending along the foundation in close approximation thereto, an insulating housing having sides supported upon said last mentioned sills and adapted to expand and contract with said frame, said housing being constructed to permit of a different rate of expansion and contraction from the frame, and means for connecting the upper part of the frame and housing whereby the frame is completely enclosed by the insulating housing.

8. In a drier of the class described, a housing having end walls provided with entry and exit slots extending horizontally thereacross, and pairs of normally contacting conveyor rolls within said housing, the pairs of conveyor rolls adjacent the entry and exit slots being adapted to contact with the portions of the housing adjacent the said slots to thereby close said slots to prevent the passage of air therethrough.

9. In a drier of the class described, a housing having end walls provided with entry and exit slots extending horizontally thereacross, and pairs of conveyor rolls vertically aligned and normally in contact with each other, the lower conveyor rolls being rotatable about fixed axes, while the upper conveyor rolls are rotatable about variable vertical axes, the pairs of conveyor rolls adjacent the said entry and exit slots being mounted so as to contact with the portions of the housing adjacent the said slots.

10. In a drier of the class described, a housing having end walls provided with entry and exit slots for the material being treated, and pairs of conveyor members mounted within said housing, said members of each pair being normally in contact, and the pairs of members adjacent said slots being in contact with portions of the housing adjacent said slots to thereby prevent the passage of air therethrough.

11. In a drier of the class described, a housing having end walls provided with entry and exit slots for the material being treated, pairs of conveyor members within said housing, said members of each pair being vertically aligned and normally in contact, the upper conveyor members being adapted to move in a vertical plane, and the pairs of conveyor members adjacent said slots being in contact with the portions of the housing adjacent said slots to thereby prevent the passage of air therethrough.

12. In a drier of the class described, a housing having end walls provided with entry and exit slots for the material being treated, and cooperating conveyor members arranged in pairs, said members of each pair being relatively movable, the pairs of members adjacent the slots being in contact with the portions of the housing adjacent said slots to thereby prevent the passage of air therethrough.

In testimony whereof I hereunto affix my signature.

ARTHUR J. VANCE.